(12) United States Patent
Kim et al.

(10) Patent No.: US 8,728,583 B2
(45) Date of Patent: May 20, 2014

(54) COMPOSITE MATERIALS, COMPOSITE FILM MANUFACTURED BY USING THE SAME AND METHOD FOR MANUFACTURING COMPOSITE FILM

(71) Applicants: LG Chem, Ltd., Seoul (KR); Eun-Sil Lee, Daejeon (KE)

(72) Inventors: Dong-Ryul Kim, Seoul (KR); Hee-Jung Kim, Daejeon (KR); Sang-Uk Ryu, Daejeon (KR); Jang-Yeon Hwang, Seoul (KR); Seung-Lac Ma, Daejeon (KR); Myeong-Geun Ko, Daejeon (KR); Gi-Cheul Kim, Daejeon (KR); Boong-Goon Jeong, Daejeon (KR); Ho-Jun Lee, Daejeon (KR); Ju-Eun Cha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/768,552

(22) Filed: Feb. 15, 2013

(65) Prior Publication Data

US 2013/0177710 A1    Jul. 11, 2013

Related U.S. Application Data

(62) Division of application No. 12/738,554, filed as application No. PCT/KR2008/006173 on Oct. 17, 2008, now Pat. No. 8,445,108.

(30) Foreign Application Priority Data

Oct. 18, 2007 (KR) .................. 10-2007-0105173
Oct. 18, 2007 (KR) .................. 10-2007-0105176

(51) Int. Cl.
*B05D 3/02* (2006.01)

(52) U.S. Cl.
USPC ..................... 427/389.8; 427/389.7

(58) Field of Classification Search
None
See application file for complete search history.

(56) References Cited

U.S. PATENT DOCUMENTS

| | | | | |
|---|---|---|---|---|
| 2,608,499 A | * | 8/1952 | Straka | 428/429 |
| 2,845,364 A | * | 7/1958 | Waggoner | 427/224 |
| 3,253,897 A | * | 5/1966 | Falls | 65/111 |
| 3,440,191 A | * | 4/1969 | Cuthill et al. | 524/792 |
| 3,628,985 A | * | 12/1971 | Hider et al. | 427/228 |
| 3,705,205 A | * | 12/1972 | Antonen | 525/477 |
| 4,976,761 A | * | 12/1990 | Allaire | 65/444 |
| 5,973,176 A | * | 10/1999 | Roscher et al. | 556/440 |
| 2005/0203239 A1 | | 9/2005 | Shibahara et al. | |
| 2007/0219309 A1 | | 9/2007 | Shibahara et al. | |

FOREIGN PATENT DOCUMENTS

| | | |
|---|---|---|
| JP | 2006-508216 A | 3/2006 |
| JP | 2007-91964 A | 4/2007 |
| KR | 20-2007-0078384 A | 7/2007 |

* cited by examiner

*Primary Examiner* — Erma Cameron
(74) *Attorney, Agent, or Firm* — McKenna Long & Aldridge LLP

(57) ABSTRACT

The present invention provides a composite material comprising a glass cloth; and an organic-inorganic hybrid composition comprising diphenylsilanediol and alkoxy silane, a composite film manufactured by using the same, and a method for manufacturing the composite film.

5 Claims, 4 Drawing Sheets

COMPOSITE MATERIALS, COMPOSITE FILM MANUFACTURED BY USING THE SAME AND METHOD FOR MANUFACTURING COMPOSITE FILM

This application is a Divisional of U.S. patent application Ser. No. 12/738,554, filed on Nov. 16, 2010, now U.S. Pat. No. 8,445,108, which is the national stage application of PCT/KR2008/006173, filed on Oct. 17, 2008, which claims the benefit of Korean Patent Application Nos. 10-2007-0105173, filed on Oct. 18, 2007 and 10-2007-0105176, filed on Oct. 18, 2007, all of which are hereby incorporated by reference in their entirety.

TECHNICAL FIELD

The present invention relates to a composite material comprising a glass cloth and an organic-inorganic hybrid composition, a composite film manufactured by using the same, and a method for manufacturing the composite film.

BACKGROUND ART

Although glass plates used for display devices, picture frames, craftwork, containers, or the like are advantageous in that they have a small coefficient of thermal expansion, superior gas barrier properties, high transparency, good surface flatness, excellent heat resistance and chemical resistance, they tend to break easily and be heavy because of their high density.

Recently, as liquid crystal displays, organic light emitting devices, and electronic paper are arousing a growing interest, research on replacing the glass substrates used in such devices with plastic counterparts is gaining momentum.

A basic substrate, plastic film and a plastic substrate having a functional coating layer are advantageous over the glass plate in terms of light weight, ease of design, and impact-resistance. Also, an economic advantage may be attained from continuous manufacturing, compared to the glass substrate.

For a plastic substrate to be used in a display device, it should have a glass transition temperature high enough to endure the transistor processing temperature and the transparent electrode deposition temperature, oxygen and water vapor barrier properties so as to prevent aging of liquid crystals and organic light emitting materials, a small coefficient of thermal expansion and good dimensional stability so as to prevent deformation of the plate due to change of the processing temperature, mechanical strength comparable to that of the conventional glass plate, chemical resistance sufficient for enduring the etching process, high transparency, low birefringence, good surface scratch resistance, etc.

Among such properties, a low coefficient of thermal expansion (CTE) is a particularly important property, and a method of manufacturing a plastic film using a glass cloth is one of methods that provide a substrate having a low coefficient of thermal expansion.

To embody a low coefficient of thermal expansion (CTE), a tightly woven glass cloth should be used. As a glass cloth has a higher weaving density, the prepared plastic film has a lower coefficient of thermal expansion (see FIG. 4).

However, in the case where a film is manufactured by using the glass cloth along with organic materials such as epoxy and polymer, there is a limit in using a tightly woven glass cloth due to air bubble generated between glass fibers, and cracks may be generated at the interface due to a low interface adhesion strength between the glass cloth and organic materials.

A method of manufacturing films using organic materials and glass cloth is exemplified by US 2005/0203239, which discloses a method of dipping and curing a glass cloth in organic materials such as epoxy and polymers.

In this method, the surface of glass cloth is modified to improve the adhesion strength at the interface between the glass cloth and organic materials. However, there is a problem in that cracks are still generated at the interface due to the low interface adhesion strength.

In addition, when a film is manufactured by dipping the glass cloth in organic materials such as epoxy and polymers, a longer processing time for curing or solvent evaporation is required, so as to reduce its productivity.

Further, when a film is manufactured by dipping the glass cloth in organic materials such as the known epoxy and polymers, it is difficult to remove air bubble generated between the glass cloths due to high viscosity. In addition, to improve the problem, the process may be performed at a high temperature or under vacuum conditions, but the process becomes complex. Thus, the process cannot be easily performed.

Furthermore, when a film is manufactured by dipping the glass cloth in organic materials such as the known epoxy and polymers, a lamination process is employed. However, there is a problem in that it is difficult to perform a continuous process by the process.

Moreover, since the glass cloth has a wavelength-dependent refractive index that is different from that of the organic materials such as the known epoxy and polymers, it is difficult to manufacture a transparent film.

DISCLOSURE

Technical Problem

It is an object of the present invention to provide a composite material, in which an interface crack and air bubble of glass fiber are prevented and its productivity is improved, a composite film manufactured by using the same, and a method for manufacturing the composite film.

In addition, it is another object of the present invention to provide a transparent composite material, a transparent composite film manufactured by using the same, and a method for manufacturing the transparent composite film by controlling a refractive index of the organic-inorganic hybrid composition.

Technical Solution

The present invention provides a composite material comprising a glass cloth; and an organic-inorganic hybrid composition that comprises diphenylsilanediol and alkoxy silane.

The present invention provides a composite film comprising a glass cloth; and an organic-inorganic hybrid composition that comprises diphenylsilanediol and alkoxy silane, manufactured by using the composite material according to the present invention.

The present invention provides an electronic device comprising the composite film according to the present invention.

The present invention provides a method for manufacturing the composite film, comprising the steps of a) preparing a glass cloth; b) preparing an organic-inorganic hybrid composition in a sol state, comprising diphenylsilanediol and alkoxy silane; and c) dipping and curing the glass cloth in the organic-inorganic hybrid composition in a sol state.

According to the present invention, it provides a transparent composite material, a transparent composite film, an electronic device comprising the transparent composite film, and a method for manufacturing the transparent composite film cloth by adjusting the refractive index of the organic-inorganic hybrid composition for the difference in the refractive indices between the organic-inorganic hybrid composition after curing and the glass cloth to be 0.01 or less.

Advantageous Effects

According to the present invention, a composite film is manufactured by sol-gel reaction between an organic-inorganic hybrid composition having a low viscosity and a short curing time and a glass cloth, and thus the interface adhesion strength between the glass fiber and the organic-inorganic hybrid material is improved to prevent generation of interface cracks and air bubble at the interface of the glass fiber and the organic-inorganic hybrid material.

The organic-inorganic hybrid has a short curing time to improve productivity of the film, whereas a longer processing time for curing or solvent evaporation is required in the case of using the known epoxy and polymers.

Productivity can be improved because it is possible to operate continuous process wherein film may be produced by repeating the method comprising dipping the glass cloth in the organic-inorganic hybrid composition with low viscosity and short curing time.

According to the present invention, it provides a transparent composite material, a transparent composite film, an electronic device comprising the transparent composite film, and a method for manufacturing the transparent composite film cloth by adjusting the refractive index of the organic-inorganic hybrid composition for the difference in the refractive indices between the organic-inorganic hybrid composition after curing and the glass cloth to be 0.01 or less.

BEST MODE

Figure 1:
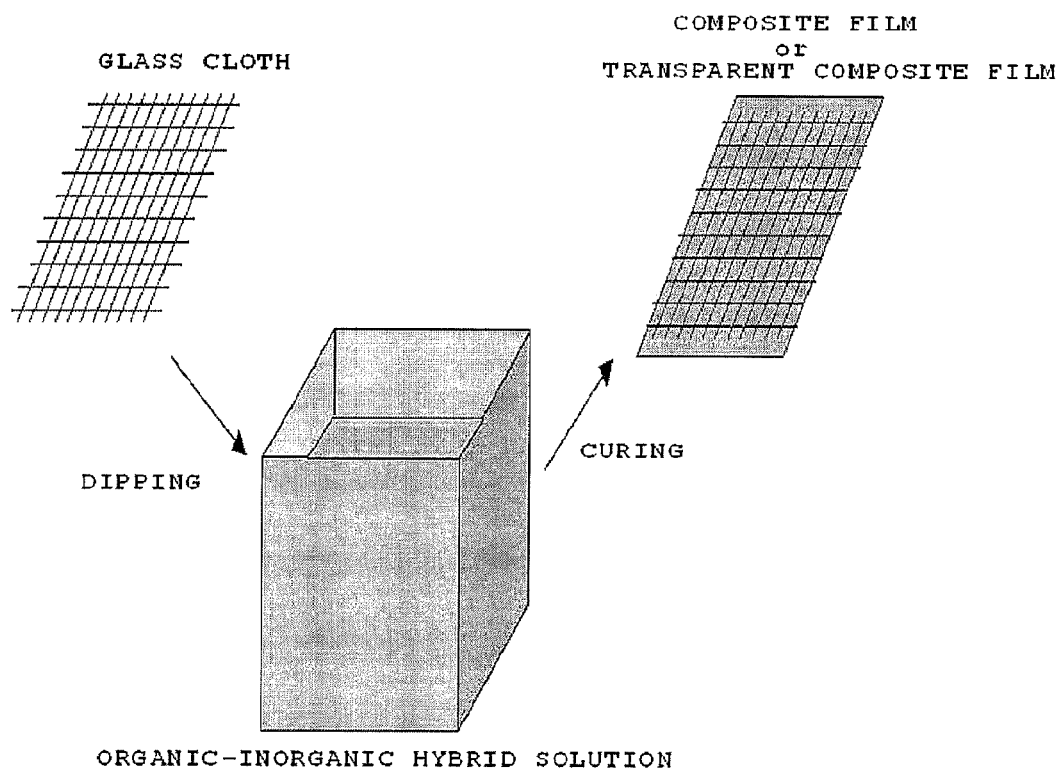
FIG. 1 is a diagram showing the process of manufacturing the composite film according to the present invention of which refractive index is not adjusted or the transparent composite film according to the present invention of which refractive index is adjusted.

The composite material according to the present invention comprises a glass cloth; and an organic-inorganic hybrid composition comprising diphenylsilanediol and alkoxy silane.

The glass cloth can be divided into various types depending on raw components, thickness, and shape of the glass fiber, and divided into various types depending on weaving types of glass cloth and the number of fiber per bundle, and may be selected therefrom.

The glass cloth may have a thickness of 10 to 200 μm.

The glass cloth has a refractive index of 1.51 (s-glass) to 1.56 (e-glass).

The diphenylsilanediol is a main ingredient, and functions as a tanning material to improve flexibility, which is a property required for the composite film.

The refractive index can be adjusted so that the organic-inorganic hybrid composition, which uses the diphenylsilanediol and the metal alkoxide, has a refractive index, for instance, between 1.48~1.60. Also, the crosslink structure of the metal alkoxide can be adjusted in order to enhance the flexibility when the di-functional diphenylsilanediol and the metal alkoxide are used together.

The alkoxy silane may be one or more selected from methyltrimethoxysilane, methyltriethoxysilane, tetramethoxysilane, tetraethoxysilane, phenyltriethoxysilane, vinyltrimethoxysilane, vinyltriethoxysilane, glycidyloxypropyltrimethoxysilane, aminopropyltriethoxysilane, and aminopropyltrimethoxysilane.

The organic-inorganic hybrid composition may contain 10 to 100 parts by weight of alkoxy silane, based on the 100 parts by weight of diphenylsilanediol.

The difference in the refractive indices between the organic-inorganic hybrid composition after curing and the glass cloth may be 0.01 or less. The difference in the refractive index of 0.01 or less means that the difference in the refractive index after curing organic-inorganic hybrid composition and the refractive index of the glass cloth is 0.01 or less. Also, the refractive index after curing organic-inorganic hybrid composition is defined as the index which is measured after curing only the organic-inorganic hybrid composition without including the glass cloth.

A transparent composite material and a transparent composite film (Refer to example 1, 3, 4) can be provided when the difference in the refractive index is 0.01 or less between the organic-inorganic hybrid composition and glass cloth after curing of the organic-inorganic hybrid composition. A composite material and a composite film (Refer to example 2) can be provided When the refractive index is not adjusted.

Any one of the diphenylsilanediol and alkoxy silane may have a higher refractive index than that of the glass cloth; and the other one may have a lower refractive index than that of the glass cloth or the same refractive index as that of the glass cloth.

In this connection, in the case of using a glass cloth having a refractive index of 1.51, the organic-inorganic hybrid composition may include diphenylsilanediol having a refractive index of 1.513 that is higher than that of the glass cloth, and alkoxy silane having a refractive index of 1.38~1.51 that is lower or the same as that of the glass cloth. When the refractive index is measured after curing the organic-inorganic hybrid composition, a difference in the refractive indices between the organic-inorganic hybrid composition and the glass cloth may be 0.01 or less, preferably 0.005 or less. In this regard, a transparent composite material and a transparent composite film may be provided.

The organic-inorganic hybrid composition according to the present invention may further include polymer and/or metal alkoxide. Here, the difference in the birefringence can be reduced by wavelength when metal alkoxide is used.

The polymer may be preferably a thermoplastic resin, and more preferably a thermoplastic resin capable of transmitting visible light.

Examples of the thermoplastic resin may one or more selected from polyolefins selected from the group consisting of low density polyethylene, high density polyethylene, ethylene-propylene copolymer, ethylene-butene copolymer, ethylene-hexene copolymer, ethylene-octene copolymer, ethylene-norbornene copolymer, ethylene-DMON copolymer, polypropylene, ethylene-acetic acid vinyl copolymer, ethylene-methylmethacrylate copolymer, and ionomer resin; polyesters selected from the group consisting of polyethyleneterephthalate, polybutyleneterephthalate, and polyethylenenaphthalate; nylon-6, or nylon-6,6, metaxylenediamine-adipic acid condensation polymers; amide-based resins; acrylic resins; stylene-acrylonitrile resins selected from the group consisting of polystylene or stylene-acrylonitrile copolymer, stylene-acrylonitrile-butadiene copolymer, and polyacrylonitrile; hydrophobic cellulose resins selected from the group consisting of triacetic acid cellulose and diacetic acid cellulose; halogen containing resins selected from the group consisting of polyvinyl chloride, polyvinylidene chloride, polyvinylidene fluoride, and polytetrafluoroethylene; hydrogen-bonding resins selected from the group consisting of polyvinylalcohol, ethylene-vinylalcohol copolymer, and cellulose derivative; polycarbonate; polysulfone; polyethersulfone; polyetheretherketone; polyphenyleneoxide; polymethyleneoxide; and liquid crystal resins. In this connection, example of the acrylic resin may include polymethylmethacrylate.

In addition, the resin used as the polymer preferably has good heat resistance, for example, a glass transition temperature (Tg) of 120 to 300° C., more preferably 150 to 300° C., and most preferably 180 to 300° C.

Among the thermoplastic resins, examples of the resin having good heat resistance may include one or more selected from ethylene-norbornene copolymer, ethylene-DMON copolymer, polyethyleneterephthalate, polyethylenenaphthalate, triacetic acid cellulose, diacetic acid cellulose, polyvinylidene chloride, polyvinylidene fluoride, polytetrafluoroethylene, polyvinylalcohol, ethylene-vinylalcohol copolymer, polycarbonate, polysulfone, polyethersulfone, polyetheretherketone, and liquid crystal resin, and they may be used alone or in combination of two or more thereof.

In the case where the organic-inorganic hybrid composition further includes a polymer, the organic-inorganic hybrid composition may contain 10 to 100 parts by weight of alkoxy silane and more than 0 and 100 or less parts by weight of the polymer, based on 100 parts by weight of the diphenylsilanediol.

In the case where the organic-inorganic hybrid composition comprises the diphenylsilanediol, alkoxy silane, and polymer, any one of them may have a higher refractive index than that of the glass cloth; another may have a lower refractive index than that of the glass cloth or the same refractive index as that of the glass cloth; the other may have a lower refractive index than that of the glass cloth, the same refractive index as that of the glass cloth, or a higher refractive index than that of the glass cloth. When the refractive index is measured after curing the organic-inorganic hybrid composition, a difference in the refractive indices between the organic-inorganic hybrid composition and the glass cloth may be 0.01 or less, and preferably 0.005 or less. In this regard, a transparent composite material and a transparent composite film may be provided.

In this regard, in the case of using a glass cloth having a refractive index of 1.51, the organic-inorganic hybrid composition may include diphenylsilanediol having a refractive index of 1.513 that is higher than that of the glass cloth, alkoxy silane having a refractive index of 1.38 to 1.51 that is lower than or the same as that of the glass cloth, and a polymer having a refractive index of 1.51 to 1.78 that is the same as or higher than that of the glass cloth. In this connection, as an example of the polymer, polycarbonate having a refractive index of 1.586 may be used, but is not limited thereto.

The metal alkoxide may be one or more selected from titanium butoxide, titanium propoxide, aluminum butoxide, and zirconium propoxide.

In the case where the organic-inorganic hybrid composition further includes a polymer and metal alkoxide, the organic-inorganic hybrid composition may contain 10 to 100 parts by weight of alkoxy silane, more than 0 and 100 or less parts by weight of the polymer, and more than 0 and 100 or less parts by weight of the metal alkoxide, based on 100 parts by weight of diphenylsilanediol.

In the case where the organic-inorganic hybrid composition includes diphenylsilanediol, alkoxy silane, polymer, and metal alkoxide, any one of four components may have a higher refractive index than that of the glass cloth; another may have a lower refractive index than that of the glass cloth or the same refractive index as that of the glass cloth; the others may each independently have a lower refractive index than that of the glass cloth, the same refractive index as that of the glass cloth, or a higher refractive index than that of the glass cloth.

When the refractive index is measured after curing the organic-inorganic hybrid composition, a difference in the refractive indices between the organic-inorganic hybrid composition and the glass cloth may be 0.01 or less, and preferably 0.005 or less. In this regard, a transparent composite material and a transparent composite film may be provided.

In this regard, in the case of using a glass cloth having a refractive index of 1.51, the organic-inorganic hybrid composition may include diphenylsilanediol having a refractive index of 1.513 that is higher than that of the glass cloth, alkoxy silane having a refractive index of 1.38 to 1.51 that is lower than or the same as that of the glass cloth, a polymer having a refractive index of 1.51 to 1.78 that is the same as or higher than that of the glass cloth, and metal alkoxide having a refractive index of 1.7 to 2.7 that is higher than that of the glass cloth. In this connection, as an example of the polymer, polycarbonate having a refractive index of 1.586 may be used, but is not limited thereto.

The composite film according to the present invention is manufactured by using the composite material according to the present invention to include the glass cloth; and the organic-inorganic hybrid composition containing diphenylsilanediol and alkoxy silane. Specific description will be omitted since the above-mentioned description will be equally applied hereto.

The organic-inorganic hybrid composition may further include polymer and/or metal alkoxide.

In this regard, a difference in the refractive indices between the organic-inorganic hybrid composition after curing and the glass cloth is 0.01 or less provided is a transparent composite film.

A transparent composite film (Refer to example 1, 3, 4) can be provided when the difference in the refractive index is 0.01 or less between the organic-inorganic hybrid composition and glass cloth after curing of the organic-inorganic hybrid composition. When the refractive index is not adjusted a transparent composite film can be provided. (Refer to example 2)

A transparent composite film (Refer to example 1, 3, 4) can be provided when the difference in the refractive index is 0.01 or less between the organic-inorganic hybrid composition and glass cloth after curing of the organic-inorganic hybrid composition. A composite film (Refer to example 2) can be provided When the refractive index is not adjusted.

The composite film or transparent composite film according to the present invention may be used as a substrate and a functional film of various electronic devices such as a substrate of various display devices, a substrate of solar cell, and a functional film of display device.

For example, the composite film or the transparent composite film according to the present invention may be used as a substrate of liquid crystal display (LCD), a substrate of color filter, a substrate of organic EL display device, and an optical film of display device, but is not limited thereto.

On the other hand, the electronic device according to the present invention may include the composite film or the transparent composite film according to the present invention.

Examples of the electronic device may include various display devices and solar cells.

The method of manufacturing the composite film according to the present invention may comprises the steps of a) preparing a glass cloth; b) preparing an organic-inorganic hybrid composition in a sol state, comprising diphenylsilanediol and alkoxy silane; and c) dipping and curing the glass cloth in the organic-inorganic hybrid composition in a sol state (see FIG. 1).

Accordingly, the adhesion strength between the composition and the glass fiber is improved by the sol-gel reaction between the organic-inorganic hybrid composition and the glass cloth, and the improved adhesion strength provides the prepared transparent composite film with crack-free property.

The glass cloth may be divided into various types depending on raw components, thickness, and shape of the glass fiber, and divided into various types depending on weaving types of glass cloth and the number of fiber per bundle, and may be selected therefrom.

The glass cloth may have a thickness of 10 to 200 μm.

The glass cloth has a refractive index of 1.51 (s-glass) to 1.56 (e-glass).

The diphenylsilanediol is a main ingredient, and functions as a tanning material to improve flexibility, which is a property required for the composite film.

Specifically, diphenylsilanediol is used with alkoxy silane to control the degree of the cross-linking density, thereby improving the flexibility of the composite film.

When the diphenylsilanediol of low partial hydrolysis is used with alkoxy silane, the glass cloth is easily dipped in the organic-inorganic hybrid composition containing the diphenylsilanediol, thereby preventing generation of air bubble on the composite film and manufacturing the crack-free composite film.

As such, in the case of adding diphenylsilanediol, the flexibility of the composite film is ensured, thereby providing a composite film having good heat resistance and dimensional stability.

The alkoxy silane may be one or more selected from methyltrimethoxysilane, methyltriethoxysilane, tetramethoxysilane, tetraethoxysilane, phenyltriethoxysilane, vinyltrimethoxysilane, vinyltriethoxysilane, glycidyloxypropyltrimethoxysilane, aminopropyltriethoxysilane, and aminopropyltrimethoxysilane.

The organic-inorganic hybrid composition may contain 10 to 100 parts by weight of alkoxy silane, based on 100 parts by weight of diphenylsilanediol.

A difference in the refractive indices between the organic-inorganic hybrid composition after curing and the glass cloth may be 0.01 or less, and thus a transparent composite film may be provided. When adjusting the refractive index of the organic-inorganic hybrid composition for the difference in the refractive indices between the organic-inorganic hybrid composition after curing and the glass cloth to be 0.01 or less, the method of manufacturing the transparent composite film can be provided (Refer to FIG. 1).

Like this, When adjusting the refractive index of the organic-inorganic hybrid composition for the difference in the refractive indices between the organic-inorganic hybrid composition after curing and the glass cloth to be 0.01 or less, the method of manufacturing the transparent composite film can be provided. And if the refractive index is not controlled, the composite film manufacturing method can be provided.

Any one of the diphenylsilanediol and alkoxy silane may have a higher refractive index than that of the glass cloth; and the other one may have a lower refractive index than that of the glass cloth or the same refractive index as that of the glass cloth.

In this connection, in the case of using a glass cloth having a refractive index of 1.51, the organic-inorganic hybrid composition may include diphenylsilanediol having a refractive index of 1.513 that is higher than that of the glass cloth, and alkoxy silane having a refractive index of 1.38~1.51 that is lower or the same as that of the glass cloth. When the refractive index is measured after curing the organic-inorganic hybrid composition, a difference in the refractive indices between the organic-inorganic hybrid composition and the glass cloth may be 0.01 or less, preferably 0.005 or less. In this regard, a transparent composite film may be provided.

The organic-inorganic hybrid composition according to the present invention may further include polymer and/or metal alkoxide.

The polymer may be preferably a thermoplastic resin, and more preferably a transparent thermoplastic resin capable of transmitting visible light.

Examples of the thermoplastic resin may include one or more selected from polyolefins selected from the group consisting of low density polyethylene, high density polyethylene, ethylene-propylene copolymer, ethylene-butene copolymer, ethylene-hexene copolymer, ethylene-octene copolymer, ethylene-norbornene copolymer, ethylene-DMON copolymer, polypropylene, ethylene-acetic acid vinyl copolymer, ethylene-methylmethacrylate copolymer, and ionomer resin; polyester selected from the group consisting of polyethyleneterephthalate, polybutyleneterephthalate, and polyethylenenaphthalate; nylon-6, or nylon-6,6, metaxylenediamine-adipic acid condensation polymer; amide-based resin; acrylic resin; stylene-acrylonitrile resins selected from the group consisting of polystylene or stylene-acrylonitrile copolymer, stylene-acrylonitrile-butadiene copolymer, and polyacrylonitrile; hydrophobic cellulose resins selected from the group consisting of triacetic acid cellulose and diacetic acid cellulose; halogen containing resins selected from the group consisting of polyvinyl chloride, polyvinylidene chloride, polyvinylidene fluoride, and polytetrafluoroethylene; hydrogen-bonding resins selected from the group consisting of polyvinylalcohol, ethylene-vinylalcohol copolymer, and cellulose derivative; polycarbonate; polysulfone; polyethersulfone; polyetheretherketone; polyphenyleneoxide; polymethyleneoxide; and liquid crystal resins. In this connection, example of the amide-based resin may include polymethylmethacrylimide, and example of the acrylic resin may include polymethylmethacrylate.

The resin used as the polymer preferably has good heat resistance, for example, a glass transition temperature (Tg) of 120 to 300° C., more preferably 150 to 300° C., and most preferably 180 to 300° C.

Among the thermoplastic resins, examples of the resin having good heat resistance may include one or more selected from ethylene-norbornene copolymer, ethylene-DMON copolymer, polyethyleneterephthalate, polyethylenenaphthalate, triacetic acid cellulose, diacetic acid cellulose, polyvinylidene chloride, polyvinylidene fluoride, polytetrafluoroethylene, polyvinylalcohol, ethylene-vinylalcohol copolymer, polycarbonate, polysulfone, polyethersulfone, polyetheretherketone, and liquid crystal resin, and they may be used alone or in combination of two or more thereof.

In the case where the organic-inorganic hybrid composition further includes the polymer, the organic-inorganic hybrid composition may contain 10 to 100 parts by weight of alkoxy silane and more than 0 and 100 or less parts by weight of the polymer, based on 100 parts by weight of the diphenylsilanediol.

In the case where the organic-inorganic hybrid composition includes diphenylsilanediol, alkoxy silane, and polymer, any one of them may have a higher refractive index than that of the glass cloth; another may have a lower refractive index than that of the glass cloth or the same refractive index as that of the glass cloth; the other may have a lower refractive index than that of the glass cloth, the same refractive index as that of the glass cloth, or a higher refractive index than that of the glass cloth. When the refractive index is measured after curing the organic-inorganic hybrid composition, a difference in the refractive indices between the organic-inorganic hybrid composition and the glass cloth may be 0.01 or less, and preferably 0.005 or less. In this regard, a transparent composite film may be provided.

In this regard, in the case of using a glass cloth having a refractive index of 1.51, the organic-inorganic hybrid composition may include diphenylsilanediol having a refractive index of 1.513 that is higher than that of the glass cloth, alkoxy silane having a refractive index of 1.38 to 1.51 that is lower than or the same as that of the glass cloth, and a polymer having a refractive index of 1.51 to 1.78 that is the same as or higher than that of the glass cloth. In this connection, as an example of the polymer, polycarbonate having a refractive index of 1.586 may be used, but is not limited thereto.

The metal alkoxide may be one or more selected from titanium butoxide, titanium propoxide, aluminum butoxide, and zirconium propoxide.

In the case where the organic-inorganic hybrid composition further includes the polymer and metal alkoxide, the organic-inorganic hybrid composition may contain 10 to 100 parts by weight of alkoxy silane; more than 0 and 100 or less parts by weight of the polymer; and more than 0 and 100 or less parts by weight of the metal alkoxide, based on 100 parts by weight of diphenylsilanediol.

Specifically, 10 to 100 parts by weight of alkoxy silane and more than 0 and 100 or less parts by weight of the metal alkoxide were mixed, based on 100 parts by weight of diphenylsilanediol, 100 parts by weight of diphenylsilanediol, and then more than 0 and 100 or less parts by weight of distilled water is added, based on 100 parts by weight of diphenylsilanediol, followed by partial hydrolysis at a temperature range of 25 to 100° C. for 10 min to 24 hrs. Then, more than 0 and 100 or less parts by weight of the polymer is added thereto, based on 100 parts by weight of diphenylsilanediol to manufacture the organic-inorganic hybrid composition.

In step b), to manufacture a stable organic-inorganic hybrid composition having a low viscosity in a sol state, the reaction may be subjected at 0° C. to 100° C., preferably 0° C. to 50° C., and most preferably 0° C. to 25° C.

In step b), upon manufacturing the organic-inorganic hybrid composition in a sol state, the reaction is slowly subjected at 25° C. to prevent rapid gelation of the organic-inorganic hybrid composition.

In the case where the organic-inorganic hybrid composition includes diphenylsilanediol, alkoxy silane, polymer, and metal alkoxide, any one of four components may have a higher refractive index than that of the glass cloth; another may have a lower refractive index than that of the glass cloth or the same refractive index as that of the glass cloth; the others may each independently have a lower refractive index than that of the glass cloth, the same refractive index as that of the glass cloth, or a higher refractive index than that of the glass cloth.

When the refractive index is measured after curing the organic-inorganic hybrid composition, a difference in the refractive indices between the organic-inorganic hybrid composition and the glass cloth may be 0.01 or less, and preferably 0.005 or less. In this regard, a transparent composite film may be provided.

In this regard, in the case of using a glass cloth having a refractive index of 1.51, the organic-inorganic hybrid composition may include diphenylsilanediol having a refractive index of 1.513 that is higher than that of the glass cloth, alkoxy silane having a refractive index of 1.38 to 1.51 that is lower than or the same as that of the glass cloth, a polymer having a refractive index of 1.51 to 1.78 that is the same as or higher than that of the glass cloth, and metal alkoxide having a refractive index of 1.7 to 2.7 that is higher than that of the glass cloth. In this connection, as an example of the polymer, polycarbonate having a refractive index of 1.586 may be used, but is not limited thereto.

Step c) may be repeated at least once. That is, after the glass cloth is dipped in the organic-inorganic hybrid composition in a sol state, the curing process may be performed once, or repeated several times. The continuous process of dipping and curing the glass cloth in the organic-inorganic hybrid composition having a low viscosity and a short curing time is repeated several times to manufacture the transparent composite film, thereby improving the productivity.

In step c), the glass cloth burned in an oxygen furnace at 500 to 700° C. for 10 to 60 min may be used. When the burned glass cloth is used, the organic material adsorbed on the surface of the glass cloth can be removed, thereby improving adhesion between the dipping solution and the surface of glass cloth.

In step c), after the glass cloth is dipped in the organic-inorganic hybrid composition in a sol state, the glass cloth can be cured at 50 to 300° C. for 5 min to 2 hrs. The organic-inorganic hybrid has a short curing time to improve productivity of the transparent composite film, whereas a longer processing time for curing or solvent evaporation is required in the case of using the known epoxy and polymers.

The present invention provides a composite film or a transparent composite film manufactured by the above described method.

MODE FOR INVENTION

Hereinafter, the present invention will be described in more detail with reference to the accompanying Drawings and Examples. However, these Examples are for illustrative purposes only, and the invention is not intended to be limited by these Examples.

Example 1

100.0 parts by weight of diphenylsilanediol (refractive index before curing: 1.513), 32.5 parts by weight of tetraethoxysilane (refractive index before curing: 1.382), 64.0 parts by weight of glycidyloxypropyltrimethoxysilane (refractive index before curing: 1.429), 0.5 part by weight of aminopropyltrimethoxysilane (refractive index before curing: 1.424), 2.0 parts by weight of aluminum butoxide (refractive index before curing: 1.439, refractive index after curing: 1.7), and 1.0 part by weight of zirconium propoxide (refractive index before curing: 1.451, refractive index after curing: 2.2) were mixed together, and 80.0 parts by weight of distilled water was added thereto, followed by hydrolysis at 25° C. for 24 hrs to prepare an organic-inorganic hybrid composition in a sol state. 5 parts by weight of polyarylate was added thereto to prepare a dipping organic-inorganic hybrid composition in a sol state.

To remove organic materials on the surface, the glass cloth (thickness: 50 μm, refractive index: 1.51) prepared by using S-glass that was burned in an oxygen furnace at 500° C. for 10 min was primarily dipped in the dipping organic-inorganic hybrid composition in a sol state, and then residual solvent was removed at room temperature for 1 min, followed by primary curing at a 120° C. oven for 5 min.

After curing, second dipping and curing were performed in the same manners as the primary dipping and curing to manufacture a transparent composite film.

Example 2

A composite film was manufactured in the same manners as in Example 1, except for adding no aluminum butoxide, zirconium propoxide, and polyarylate upon the preparation of the dipping organic-inorganic hybrid composition in a sol state.

Example 3

100.0 parts by weight of diphenylsilanediol (refractive index before curing: 1.513), 32.5 parts by weight of tetraethoxysilane (refractive index before curing: 1.382), 64.0 parts by weight of glycidyloxypropyltrimethoxysilane (refractive index before curing: 1.429), 0.5 part by weight of aminopropyltrimethoxysilane (refractive index before curing: 1.424), 2.0 parts by weight of aluminum butoxide (refractive index before curing: 1.439, refractive index after curing: 1.7), 1.0 part by weight of zirconium propoxide (refractive index before curing: 1.451, refractive index after curing: 2.2), and 30.0 parts by weight of titaniumbutoxide (refractive index before curing: 1.49, refractive index after curing: 2.7) were mixed together, and 80.0 parts by weight of distilled water was added thereto, followed by hydrolysis at 25° C. for 24 hrs to prepare an organic-inorganic hybrid composition in a sol state. 5 parts by weight of polyarylate was added thereto to prepare a dipping organic-inorganic hybrid composition in a sol state.

To remove organic materials on the surface, the glass cloth (thickness: 50 μm, refractive index: 1.56) prepared by using E-glass that was burned in an oxygen furnace at 500° C. for 10 min was primarily dipped in the dipping organic-inorganic hybrid composition in a sol state, and then residual solvent was removed at room temperature for 1 min, followed by primary curing at a 120° C. oven for 5 min.

After curing, second dipping and curing were performed in the same manners as the primary dipping and curing to manufacture a transparent composite film.

Example 4

A transparent composite film was manufactured in the same manners as in Example 3, except for adding no aluminum butoxide, zirconium propoxide, and polyarylate upon the preparation of the dipping organic-inorganic hybrid composition in a sol state and using S-glass instead of E-glass.

Comparative Example 1

100 parts by weight of epoxy compound (trade name: ERL-4221, Dow Chemical), 134 parts by weight of a curing agent, ANHYDRIDE (MH700G, New Japan Chemical), 2 parts by weight of triphenylphosphonium bromide, and 150 parts by weight of methylethylketone were mixed together, and then the glass cloth (thickness: 50 μm, refractive index: 1.56) prepared by using S-glass that was dipped in the prepared dipping solution, followed by sequential curing at 100° C. for 2 hrs, at 120° C. for 2 hrs, at 150° C. for 2 hrs, at 200° C. for 2 hrs, and at 240° C. for 2 hrs to manufacture a composite film.

Comparative Example 2

A composite film was manufactured in the same manners as in Example 1, except for using no diphenylsilanediol.

Experimental Example

The thickness of the composite films according to Examples 1 to 4 and the composite film according to Comparative Example 1 to 2 were measured using a scanning electron microscope (SEM), and a coefficient of thermal expansion and a glass transition temperature thereof were measured, and a crack test was performed. The results are shown in Table 1, and FIGS. 2 and 3. Also Refractive index and Light transmittance were measured.

The refractive index of the glass cloth in table 1 is acquired by measuring the glass cloth prior to respectively dipping the glass cloth in the dipping organic-inorganic hybrid composition of examples 1~4 and comparative example 2; and also dipping the glass cloth in the dipping solution of comparative example 1. Thus, this index is the innate refractive index of the glass cloth.

The refractive index that is measured after the curing which is shown in table 1 has been obtained by measuring the dipping organic-inorganic hybrid composition of examples 1~4 and comparative example 2 without dipping of the glass cloth and the dipping solution of comparative example 1 without dipping of the glass cloth; curing only the dipping organic-inorganic hybrid composition manufactured in comparative examples 1~4 and comparative example 2, and also curing the dipping solution manufactured in comparative example 1; and respectively measuring the cured materials thereof. The refractive index of the composition after curing in table 1 is that of only the composition of the example 1~4 and comparative example 2, and the dipping solution of the comparative example 1, wherein curing occurs without including the glass cloth.

And the light transmittance under table 1 has been measured by measuring the light transmittance rate of the film that was manufactured by dipping the glass cloth in the organic-inorganic hybrid composition of the examples 1~4 and comparative example 2, and the dipping solution of comparative example 1; and then curing, respectively.

Measurement conditions were as follows.

1) Coefficient of thermal expansion: Measurement was made in accordance with ASTM D696 at a rate of temperature rise of 10° C. per min and a stress of 5 gf using a thermomechnical analyzer (TMA), and pencil hardness was measured at a load of 200 g in accordance with ASTM D3363.

2) Glass transition temperature (Tg): Measurement was made using a differential scanning calorimeter (DSC; TA Instrument, DSC2010) at a rate of temperature rise of 10° C. per min.

3) Refractive index: Measurement was made using a refractometer (ATAGO, DR-M4) at 589 nm.

4) Light transmittance: Measurement was made in accordance with ASTM D1003 using a UV-spectrometer (Varian) at a visible range of 380 to 780 nm.

5) Crack test: a cylinder having a diameter of 1 cm is wrapped with the film, and then crack generation was observed.

Also, in example 1 and 4, where the refractive index is set at 1.51 to be of S-glass and also in example 3 where the refractive index is set at 1.56 to be E-glass, the transparency rate was 85%, 81%, and 82% respectively. Accordingly, one can see that they can be used the transparent composite film providing high transparency rate due to high transparency.

TABLE 1

|  | Thickness (SEM result) (μm) | Coefficient of thermal expansion(ppm/K) | Tg (° C.) | Crack test | Refractive index of glass cloth | Refractive index of composition after curing | Light transmittance (%) |
| --- | --- | --- | --- | --- | --- | --- | --- |
| Example 1 | 55 | 17 | 230 | No crack | 1.510 | 1.5103 | 85 |
| Example 2 | 59 | 18 | 221 | No crack | 1.510 | 1.4806 | 23 |
| Example 3 | 55 | 17 | 230 | No crack | 1.560 | 1.5604 | 82 |
| Example 4 | 60 | 18 | 220 | No crack | 1.510 | 1.5106 | 81 |
| Comparative Example 1 | 60 | 19 | 210 | crack | 1.510 | 1.5101 | 79 |
| Comparative Example 2 | 58 | 18 | 210 | crack | 1.510 | 1.5216 | 65 |

The composite films of Examples 1 to 4 according to the present invention were found to have a thickness of 55, 59, 55 and 60 μm, a coefficient of thermal expansion of 17, 18, 17 and 18 ppm/K, and a glass transition temperature of 230, 221, 230 and 220° C., respectively. Thus, in the case of using the composite films according to Examples 1 to 4 of the present invention as a substrate of display device, it can be seen that the thickness, coefficient of thermal expansion, and glass transition temperature are suitable for the substrate of display device.

Figure 2:
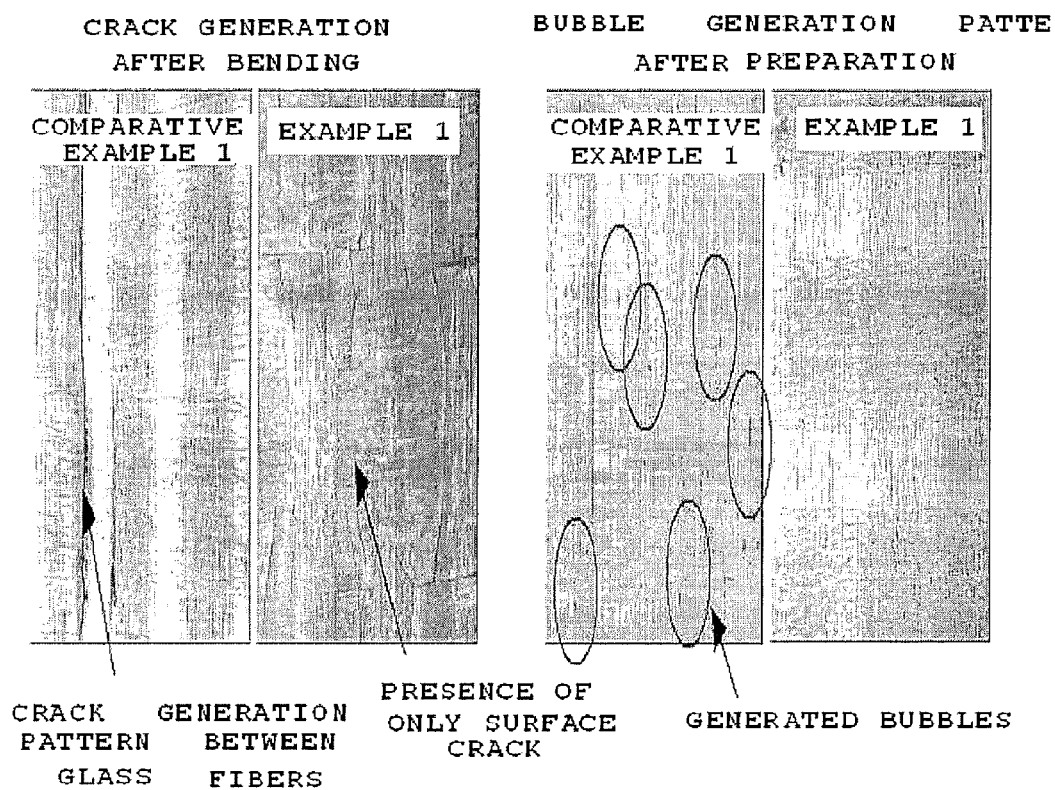
FIG. 2 is a photograph showing the result of crack test of the composite films according to Comparative Example 1 and Example 1 of the present invention.

In addition, a bending test was performed to observe the crack generation. As shown in FIG. 2 and table 1, cracks were found to be generated in the composite film according to Comparative Examples 1 to 2. In contrast, the composite film according to Examples 1 to 4 were found to have no crack at the interface between glass fibers, owing to excellent interface adhesion strength between the glass cloth and organic-inorganic hybrid composition.

In addition, as shown in FIG. 2, air bubbles were found to be generated in the composite film according to Comparative Example 1. In contrast, the composite film according to Example 1 was found to have no air bubble, owing to excellent interface adhesion strength between the glass cloth and organic-inorganic hybrid composition.

Figure 3:
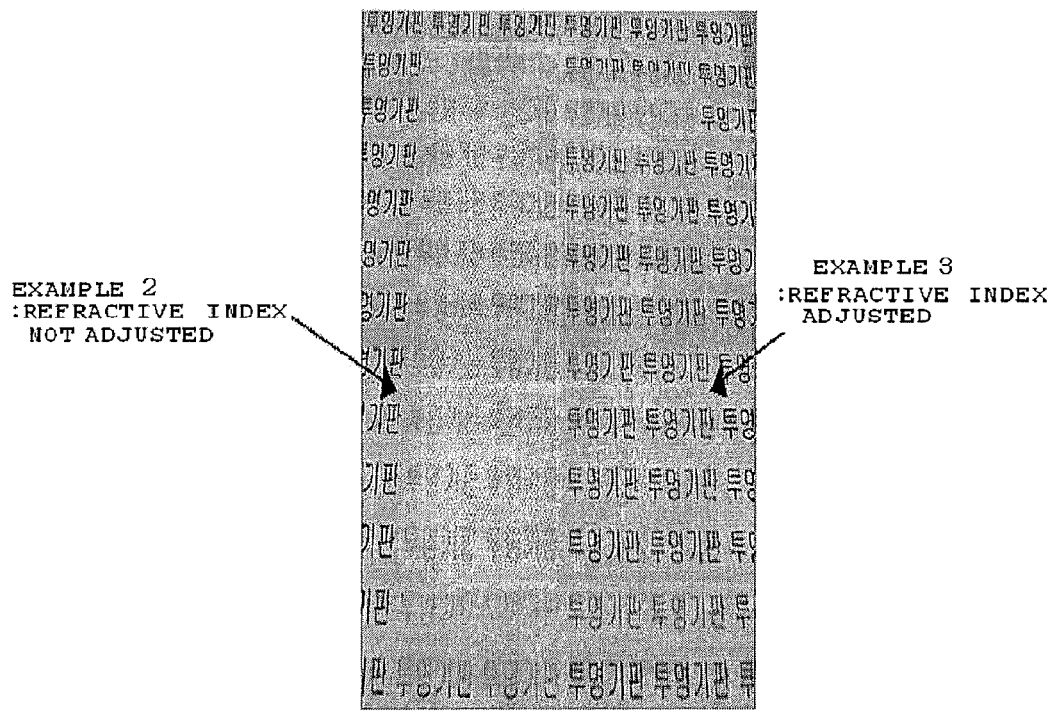
FIG. 3 is a photograph showing the comparison of light transmittance of the composite film according to Example 2 of which refractive index is not adjusted to that of the glass cloth, and the transparent composite film according to Example 3 of which refractive index is adjusted to that of the glass cloth.
Figure 4:
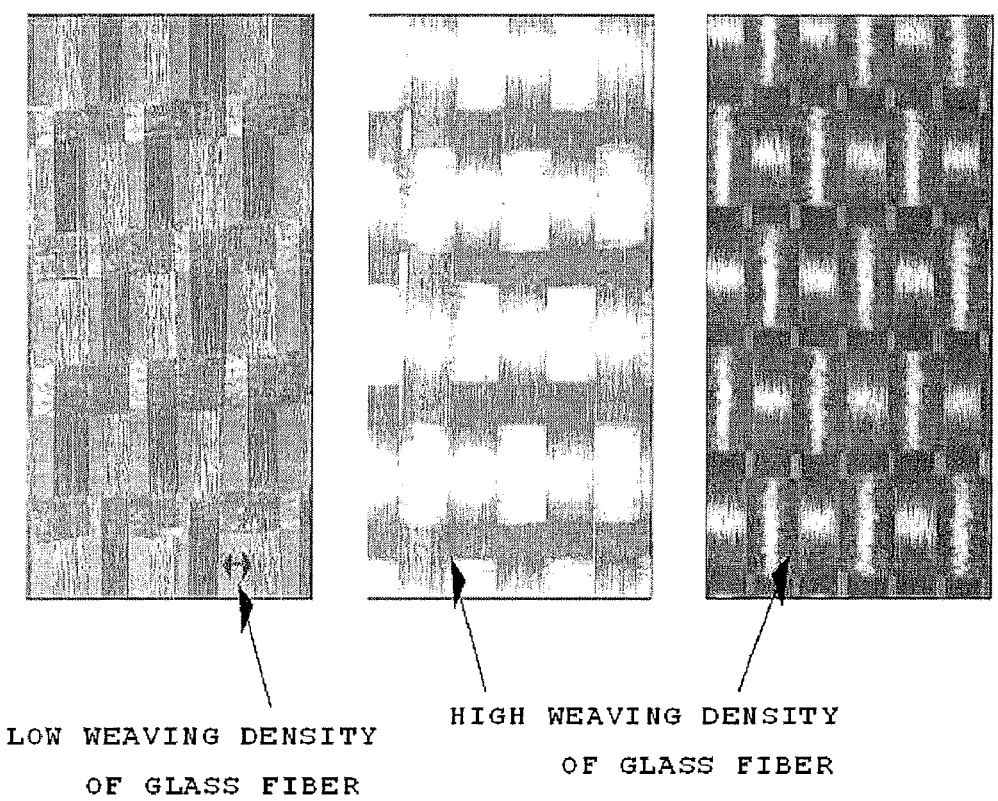
FIG. 4 is a photograph showing various glass cloths different in weaving density.

Also, the refractive index was not adjusted in example 2 in order to provide the composite film that does not request high transparency, however, in the case of examples 1,3, and 4, it is verified in table 1 and FIG. 3 that transparent composite film can be provided due to high light transmittance rate (%) by adjusting the refractive index of the organic-inorganic hybrid composition based on the refractive index of the glass cloth in order to provide transparent composite film requiring high transparency.

In particular, in the case of examples 1, 3 and 4, the refractive index of the organic-inorganic hybrid composition is adjusted in order that the difference between the refractive index of the organic-inorganic hybrid composition after curing and that of the glass cloth is 0.01 or less on the basis of the refractive index of the used glass cloth. And in the case of example 2, the difference between the refractive index is more than 0.01.

From the photos under table 1 and FIG. 3, one can see that in example 2 where the refractive index is not adjusted, the light transmittance rate is 23% thereby being able to be used as composite film that does not require high transparency rate.

Thus, according to the present invention, the composite film is manufactured by using a tightly woven glass cloth and an organic-inorganic hybrid composition having low viscosity and high reactivity, thereby providing an air bubble- and crack-free composite film.

In addition, the composite film according to the present invention maintains properties including low coefficient of thermal expansion (CTE), low heat deformation, high heat resistance and high flexibility that are basic properties of glass cloth, while having a cross-linked organic-inorganic hybrid structure, and thus the composite film according to the present invention can be used at a high temperature regardless of glass transition temperature (Tg).

Further, according to the present invention, in the case of adjusting the refractive index of the organic-inorganic hybrid composition for the difference in the refractive indices between the organic-inorganic hybrid composition after curing and the glass cloth to be 0.01 or less, thereby easily manufacturing a transparent composite film capable of being used as a transparent substrate.

The invention claimed is:

1. A method for manufacturing a composite film, comprising the steps of:
    a) preparing a glass cloth;
    b) preparing an organic-inorganic hybrid composition in a sol state, comprising diphenylsilanediol and alkoxy silane; and
    c) dipping and curing the glass cloth in the organic-inorganic hybrid composition in a sol state,
    wherein a difference in the refractive indices between the organic-inorganic hybrid composition after curing and the glass cloth is 0.01 or less.

2. The method for manufacturing a composite film according to claim 1, wherein in step a), the glass cloth has a thickness of 10 to 200 μm.

3. The method for manufacturing a composite film according to claim 1, wherein the step c) is repeated once or more.

4. The method for manufacturing a composite film according to claim 1, wherein in step c), the glass cloth burned in an oxygen furnace at 500 to 700° C. for 10 to 60 min is used.

5. The method for manufacturing a composite film according to claim 1, wherein in step c), the glass cloth is dipped in the organic-inorganic hybrid composition in a sol state, and then cured at 50 to 300° C. for 5 min to 2 hrs.

* * * * *